United States Patent [19]

de Mola

[11] Patent Number: 4,584,466
[45] Date of Patent: Apr. 22, 1986

[54] FOOD SERVICE SYSTEM

[76] Inventor: Manny L. de Mola, c/o Anthony R. Parrish, Jr., Suite 600, 799 Brickell Plz., Miami, Fla. 33131

[21] Appl. No.: 688,257

[22] Filed: Jan. 2, 1985

[51] Int. Cl.⁴ .......................... H05B 3/02; F24C 7/10
[52] U.S. Cl. .................... 219/386; 219/387; 219/432; 219/521; 165/918
[58] Field of Search ............ 219/385, 386, 387, 521, 219/432; 165/DIG. 25, DIG. 26; 312/236; 34/192, 194, 195, 197; 126/246, 268, 261

[56] References Cited

U.S. PATENT DOCUMENTS

| Re. 30,623 | 5/1981 | Schulz | 219/386 |
|---|---|---|---|
| 3,608,627 | 9/1971 | Shevlin | 219/386 |
| 3,736,981 | 6/1973 | Shevlin | 219/387 |
| 3,784,787 | 1/1974 | Shevlin | 219/386 |
| 3,908,749 | 9/1975 | Williams | 219/386 |
| 4,093,041 | 6/1978 | Davis | 219/386 |
| 4,167,983 | 9/1979 | Seider | 219/386 |
| 4,493,978 | 1/1985 | Starnes | 219/386 |

Primary Examiner—Clarence L. Albritton
Assistant Examiner—Teresa J. Walberg
Attorney, Agent, or Firm—James B. Middleton

[57] ABSTRACT

A food service system for serving a standard meal to a group of people. The various food items that go together to make up the standard meal are prepared, and meals are assembled by placing the food items on trays so that each tray is one meal for one person. The tray has wells for receiving dishes containing the food items, and some of the wells have electrical contacts connected to contacts on the handle of the tray. A heated food item is placed in a dish having an electric heater that can be energized from the contacts in the well of the tray. A group of the trays is placed into a carrier, and supported on rails by the handles of the trays. The rails are connected to a power supply so that the foods in the electrically heated dishes in the wells having electrical contacts will be heated, and others will not be heated. The carrier is ventilated to remove excess heat to prevent heating the cold foods.

5 Claims, 5 Drawing Figures

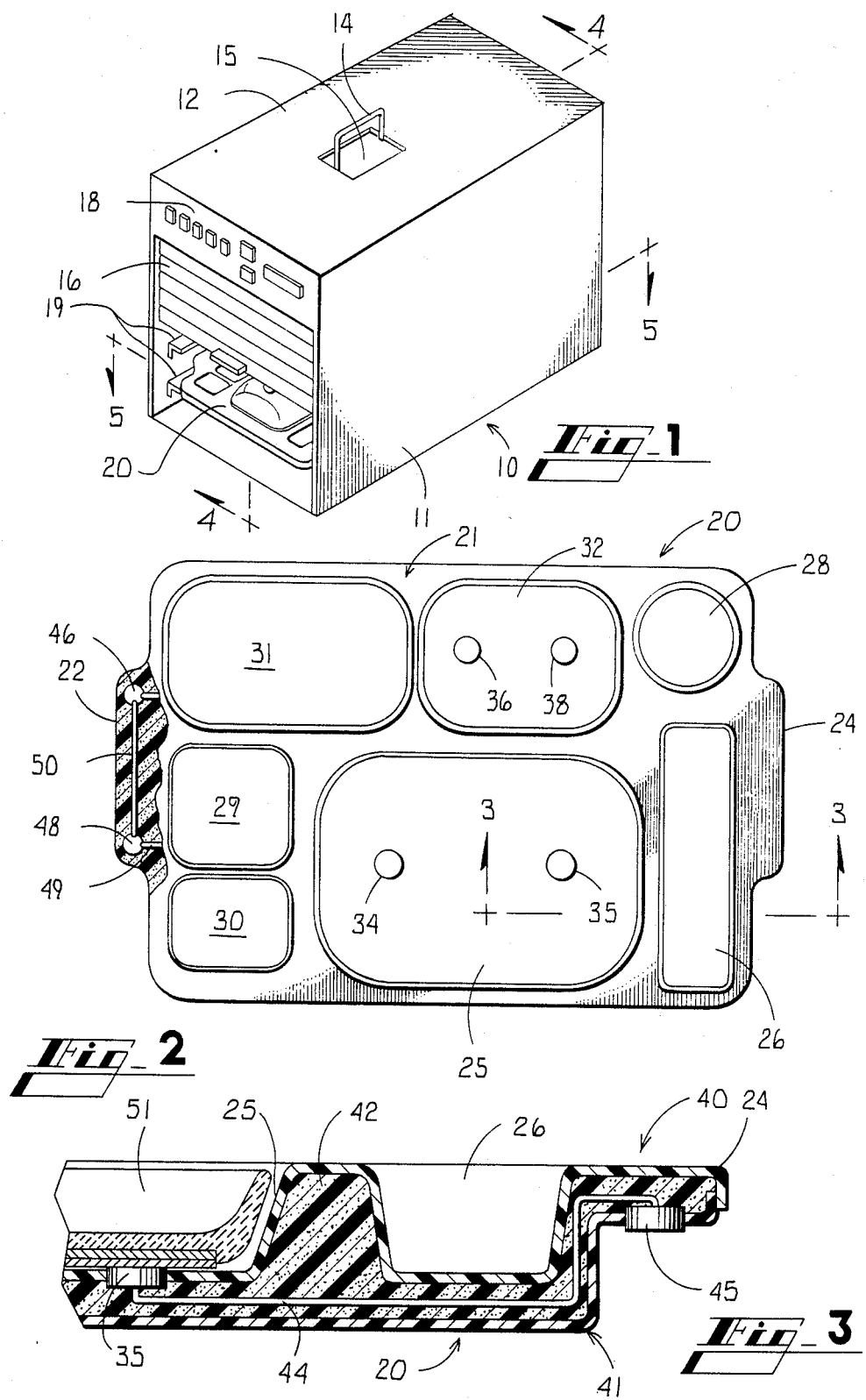

FOOD SERVICE SYSTEM

INFORMATION DISCLOSURE STATEMENT

A considerable amount of effort and ingenuity has been devoted to form service systems for various forms of institutional food service. Currently, airline food service is a major portion of the industry, though many of the problems encountered in airline food service are also encountered in institutional food service.

One of the time-consuming chores in food service is the assembling of a tray or comparable serving unit with the variety of items that make up the serving unit. For example, there must generally be some form of silverware service, and there may be a cold salad and/or desert, at least one heated entree, bread and the like. While a variety of items can be placed on a tray or similar serving unit quite efficiently using an established assembly technique, this is generally not possible because one or more food items must be heated substantially immediately before serving while other food items may be chilled immediately before serving. As a result, there is usually some preparation, and serving unit assembly, by the ultimate serving personnel just before actually serving the consumers.

Many forms of heating and cooling apparatus have been devised wherein specific dishes may be heated while stored in a container. In spite of these developments, the separate heating and assembly of the serving unit is still required by the serving personnel.

SUMMARY OF THE INVENTION

This invention relates generally to food service systems, and is more particularly concerned with a food service system wherein an entire serving unit can be assembled, and specific food items within the serving unit can be heated during storage while the remaining items are cool.

The present invention provides a tray which constitutes one individual serving unit. The tray includes a plurality of dish receiving locations, at least one of the dish receiving locations having electric contact means therein. The tray is receivable within a carrier, the carrier having opposed support rails for receiving serving trays thereon. The support rails have a voltage placed thereacross; and, the tray includes electrical contacts on each side thereof so placed as to engage the supporting rails. The electrical contacts that engage the supporting rails are electrically connected to the contact means within the dish receiving locations so that, when a tray is in place on support rails, a voltage is placed across the electrical contact means within a dish receiving location.

Using the system of the present invention, if a particular food item is to be hot at the time of service, a dish containing heating means will be utilized so that, while the entire tray is stored, the particular dish will be heated. The storage container includes ventilation means so that items intended to remain chilled are not adversely affected by those items that are heated.

BRIEF DESCRIPTION OF THE DRAWINGS

These and other features and advantages of the present invention will become apparent from consideration of the following specification when taken in conjunction with the accompanying drawings in which:

FIG. 1 is a perspective view showing a portable storage container with at least one tray, or serving unit, received therein;

FIG. 2 is a top plan view of one tray for use in the system of the present invention, portions of the tray being broken away to show the construction thereof;

FIG. 3 is an enlarged, partial cross-sectional view taken substantially along the line 3—3 in FIG. 2;

DETAILED DESCRIPTION OF THE EMBODIMENT

Figure 4:
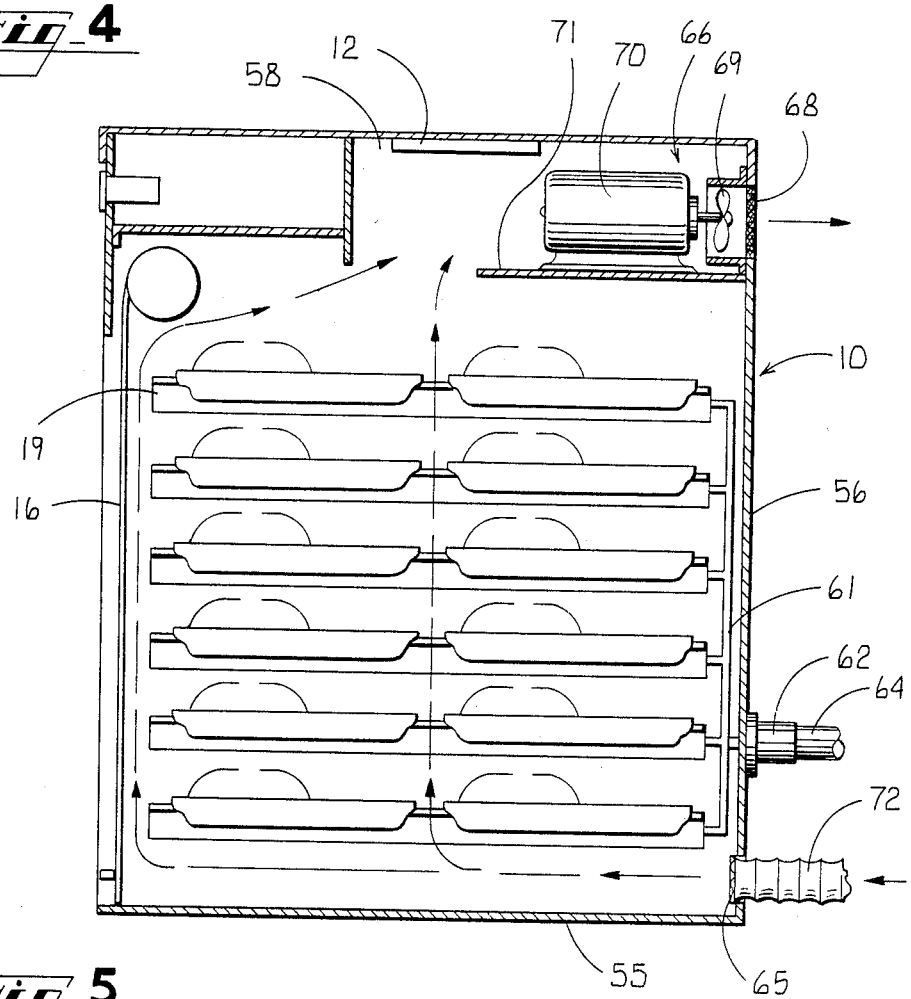
FIG. 4 is a cross-sectional view taken substantially along the line 4—4 in FIG. 1; and, FIG. 5 is a cross-sectional view taken substantially along the line 5—5 in FIG. 1.

Referring now more particularly to the drawings, and to that embodiment of the invention here presented by way of illustration, FIG. 1 shows a generally rectangular container generally designated at 10 having sides such as the side 11, and a top 12. The top 12 is fitted with a handle 14 for carrying the entire container 10. As here illustrated, the top 12 includes a recess 15 so the handle 14 can be folded to one side and provide a flush top surface.

The front of the container 11 includes a door 16. Those skilled in the art will understand that, for airline use, the door 16 must be so constructed as to be secure against inadvertent opening. The door 16 here illustrated is a tambour door, though it will also be readily understood that conventional hinged doors with appropriate latches may be used equally well.

The upper portion of the front of the container 10 comprises a control panel 18. The control panel 18 may include various switches, indicator lights and the like which will be discussed in more detail hereinafter.

As shown in FIG. 1, the door 16 is partially open to reveal a plurality of support rails 19, and one tray 20. While only one tray 20 is shown in FIG. 1, it will be understood that a relatively large number of trays 20 will be receivable within one container 10. Furthermore, the construction of the container 10 is such that a large variety of sizes can be easily provided to fit virtually any given serving condition.

Looking now at FIG. 2 of the drawings, it will be seen that one tray 20 is shown in top plan view. It will be seen that the tray 20 includes a generally rectangular body 21 with laterally extending handles 22 and 24. While the handles 22 and 24 are here shown as discrete handles having a length less than the full width of the body 21, it will be readily understood that the handles 22 and 24 could be made any length desired, keeping in mind that the handles must be long enough to support the tray 20.

The body 21 of the tray 20 includes a plurality of dish receiving locations, or wells. As shown in FIG. 2, the well 25 would normally be used for the entree, both because of its size and its location. A well 26 would probably receive silverware service and the well 28 is located to receive a beverage. The wells 29 and 30 would usually receive bread, butter, various condiments and the like while the well 31 would generally receive a salad or the like. The well 32 may receive, for example, a desert.

It will now be seen that the well 25 has electrical contacts 34 and 35 in the bottom thereof, and the well 32 has electrical contacts 36 and 38 in the bottom thereof. As will become clear hereinafter, similar electrical contacts may be placed in any of the other wells on the body 21 as desired, depending on the intended operation of the tray 20.

Attention is next directed to FIG. 3 of the drawings illustrating one preferred form of construction for the tray 20. It will be seen that there is an upper skin 40 and a lower skin 41 that fit together with a material 42 therebetween. Though many production techniques may be utilized, it will be seen that the skins 40 and 41 may be vacuum-formed thermoplastic, and these skins can be put together with an expanded plastic material as the material 42. A material such as a polyurethane would be admirable adapted for use as the material 42 since a polyurethane can be made sufficiently rigid to lend strength to the tray 20, and polyurethane has excellent insulation properties to assist in maintaining the temperature of the items on the tray 20. Nevertheless, numerous other materials can be used equally well, including the conventional styrenes, polyethylenes and others.

For providing the electrical contacts such as the contacts 34 and 35, FIG. 3 illustrates a metal contact 35 embedded in the bottom surface of the well 25, the contact 35 being received within an appropriate opening in the skin 40. The contact 35 has an electrical conductor 44 attached thereto, the conductor 44 extending towards the handles 24 for attachment to an electrical contact 45. The contact 45 is located within the skin 41, and is on the bottom surface of the handle 24.

Looking again in FIG. 2 of the drawings, it will be seen that the handle 22 has the upper portion thereof broken away to disclose contacts 46 and 48 that are located on the bottom of the handle 22 in openings in the skin 41. Electrical conductors 49 extend towards electrical contacts such as contacts 34 and 36 within the wells 25 and 32. If desired, a conductor 50 may extend between the two contacts 46 and 48 to help assure that all contacts are energized.

From the foregoing description, it should now be understood that a tray such as the tray 20 can be placed within the container 10, the handles 22 and 24 being received on the supporting rails such as the supporting rails 19. The supporting rails 19 will be appropriately connected to a power supply so that one side of the electrical line is connected through the contacts 46 and 48 to the contacts 34 and 36. The other side of the electrical supply line will be connected through contacts such as the contact 45 to contacts such as the contacts 35 and 38. With this arrangement, if a dish such as the dish indicated at 51 is utilized in the well 25 or 32, the heating element on the dish will be energized to cause the dish to be heated. If the dish in the well 25 or 32 is to remain cold, a conventional ceramic dish will be used, the electrical contacts will have no effect on the dish and the food will remain cold.

While many forms of electrically heated dish may be utilized with the system of the present invention, the system is particularly designed for use with the dish shown in the Starnes application for patent, filed July 11, 1983, Ser. No. 512,550, U.S. Pat. No. 4,493,978 issued Jan. 15, 1985, and the disclosure in that patent is incorporated herein by reference. The dish disclosed in that patent will be hereinafter referred to as the Starnes dish.

Figure 5:
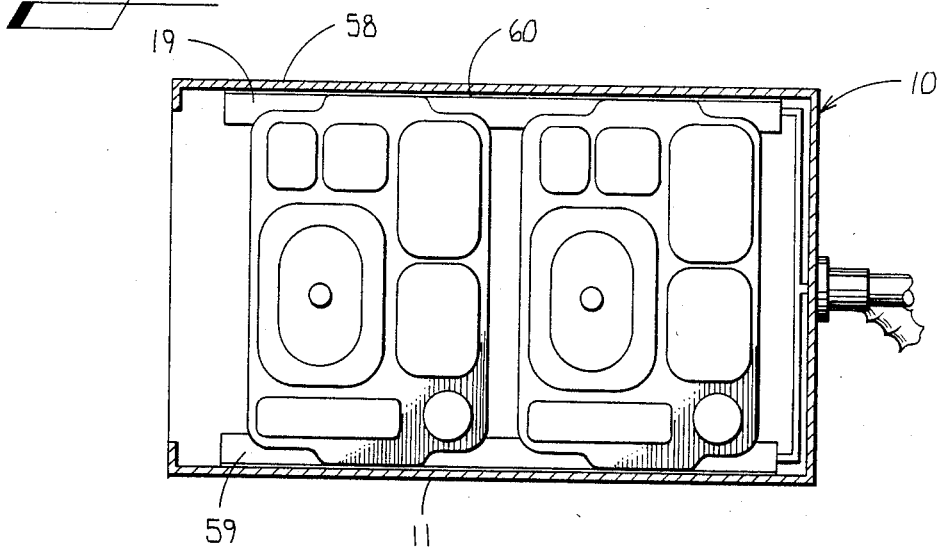

Attention is next direction to FIGS. 4 and 5 of the drawings for further description of the container 10.

While the container 10 may be constructed from numerous materials, for purposes of airline service the container 10 may be constructed of sheet aluminum of the usual aircraft quality to lend the container adequate strength with light weight. In FIG. 4 it will be seen that the container 10 includes a bottom 55 connected to a back panel 56, and the top 12. The support rails 19 are carried by the sidewall 58 while similar support rails 59 are carried by the wall 11. As is indicated in FIG. 5, the support rails 19 and 59 may have insulation strips 60 between the rails and the walls to insulate the rails electrically from the container itself. Electrical conductors 61 extend from each of the rails to a conventional jack 62 which receives a core 64 from the electrical power supply. No particular form of jacks 62 is required, and it is contemplated that a plug and jack standard for the particular industry will be utilized so connection will be very simple.

FIGS. 4 and 5 also show a plurality of trays 20 received within the container 10. Looking especially at FIG. 4 of the drawings, there is a vent hole 65 in the back 56 of the container 20. This vent hole 65 cooperates with an exhaust means generally indicated at 66, the exhaust means 66 here shown as including an exhaust port 68 having a fan 69 driven by a motor 70. The motor 70 is mounted on a baffle 71 which extends into the container 20 so air must be directed generally from the center of the container to reach the exhaust means 66.

Looking now at the arrangement shown in FIG. 4, it will be understood that air from the air supply 72 will enter the vent hole 65. The baffle 71 will tend to prevent most of the air from passing upwardly on the righthand side of the tray 20, so air will tend to go between the two stacks of trays 20, and around the trays to the space between the trays 20 and the door 16. This will be sufficient air flow that there will be negligible heating of any items that are intended to remain cold. This is especially true when the insulating quality of the trays 20 is considered.

While the container 10 is well ventilated, it will be understood that a food item in a dish such as a Starnes dish 51 within a well such as the well 25 or 32 will be heated as long as the supporting rails 19 and 59 are connected to a source of electric power.

From the foregoing description of the invention, use of the food service system of the present invention should now be understandable. The food service will be planned, and the various food items will be prepared on a mass production basis. Individual portions will be placed on individual serving dishes, and these individual serving dishes can be appropriately placed into predetermined wells in the trays 20. Some items, such as the entree, may be frozen and placed into a Starnes dish to be received within the well 25.

By utilizing the mass production techniques to assemble a plurality of trays 20, the various serving units can be assembled expeditiously at minimal cost. A plurality of trays 20 can then be received within a container 10 as illustrated in FIG. 4 of the drawings. It will be clear that the entire container 10, with its plurality of trays 20, can be refrigerated to assure freshness of the food within the container. For food service on an airplane, a plurality of containers 10 will be placed on board a particular aircraft, and each container 10 will be plugged into an appropriate electrical power supply, and preferably an air supply will be provided adjacent to the vent hole 65 of each of the containers 10. Power will be supplied to the supporting rails 19 and 59 so that a dish designed for heating food placed into the wells having electrical contacts will be heated while the remaining dishes are well ventilated to prevent heating. The control panel 18 may include a timer as a means for determining when the food should be ready for service; and, appropriate power control switches and indicator lights may also be included on the control panel 18 if desired. With this arrangement, it will be seen that the flight attendants on an individual aircraft will simply be sure power is supplied to the container 18 at the appropriate time; and, when food is to be served, power can be cut off and the various trays 20 removed from the container 10 and served directly to the consumers. There will therefore be no no separate handling of various dishes to assemble a serving unit. Additionally, the aircraft will not be required to have separate ovens and the like which are currently utilized for heating the hot food items. As a result, both space in the aircraft and time of the flight attendants are conserved.

While the container 10 is here shown as including a portable box with a carrying handle, it will be obvious to those skilled in the art that the same container can be provided with wheels and a countertop surface so the container 10 could be rolled down the aisle of an aircraft, or through the halls of an institution, to effect service of the individual trays. It will therefore be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as defined in the appended claims.

I claim:

1. In a food service apparatus for serving a plurality of consumers generally the same meal, said food service apparatus including a plurality of trays, each tray of said plurality of trays being arranged to receive one meal for one consumer, said tray including a plurality of locations, each location of said plurality of locations being such as to receive one dish containing a food item, at least one location of said plurality of locations being a heating location for heating a dish received thereon when said dish includes heating means, in combination therewith, said heating location including a first pair of electrical contacts exposed for engaging a dish received on said heating location, said tray including a pair of handles, one handle of said pair of handles being at each end of said tray for supporting said tray, a second pair of electrical contacts, one electrical contact of said second pair of electrical contacts being on a each of said handles on the lower surface thereof, first conductor means connecting one contact of said first pair of electrical contacts to one contact of said second pair of electrical contacts, and second conductor means connecting the other contact of said first pair of electrical contacts to the other contact of said second pair of electrical contacts, a carrier for receiving said plurality of trays, said carrier comprising a container including opposed side walls, a plurality of pairs of rails carried by said side walls and electrically insulated therefrom, each pair of rails of said plurality of pairs of rails including two rails spaced apart to receive opposite ends of one tray of said plurality of trays, a jack carried by said container, circuit means connecting said jack to said plurality of pairs of rails to place a voltage between the rails of each pair of rails, and ventilating means for passing ventilating air through said container, the arrangement being such that said second pair of electrical contacts can receive electrical power from said rails and provide power to a dish on said heating location, said dish on said heating location being heated only when said dish on said heating location includes heating means, said ventilating means serving to maintain unheated dishes cool while said heated dishes are heated.

2. In a food service apparatus as claimed in claim 1, each tray of said plurality of trays further including an upper skin defining a plurality of wells, one well of said plurality of well being at each location of said plurality of locations, a lower skin defining the bottom surface of said tray and being spaced from said upper skin, said first conductor means and said second conductor means extending between said upper skin and said lower skin, and a filler between said upper skin and said lower skin, said first pair of electrical contacts extending through said upper skin for contacting a dish, said second pair of electrical contacts extending through said lower skin for contacting said rails.

3. In a food service apparatus as claimed in claim 2, said housing including a top portion above said plurality of pairs of rails and a bottom portion below said plurality of pairs of rails, blower means located in said top portion, an exhaust port in said housing adjacent to said blower means, said bottom portion having a vent defined therein for receiving ventilating air, said trays being received between said top portion and said bottom portion.

4. In a food service apparatus as claimed in claim 3, said at least one location comprising a plurality of heating locations, additional first contact means in each heating location of said plurality of heating locations, and additional first conductor means connecting one contact of each of said additional first contact means to said one contact of said second pair of electrical contacts, and additional second conductor means connecting the other contact of each of said additional first contact means to said other contact of said second pair of electrical contacts.

5. A method for serving a plurality of meals to a plurality of consumers, wherein each meal of said plurality of meals includes the same food items and includes at least one heated food item and at least one unheated food item, said method including the steps of preparing all food items for said plurality of meals, placing said heated food items in dishes having heating means therein, assembling all meals of said plurality of meals by placing selected ones of said food items on a plurality of trays so that each tray of said plurality of trays holds one meal of said plurality of meals, the step of placing selected ones of said food items including the step of placing said at least one heated food item in the dish having heating means on one heating location of a plurality of heating locations of said tray and placing said unheated food item on another location of said tray, placing said plurality of trays in a carrier having power supply means and transporting said carrier to the location for serving said meals, providing power to said carrier for a predetermined length of time, ventilating said carrier during the step of providing power to said carrier so that said heated food item is heated and said unheated food item is kept cool by said ventilation, and distributing said plurality of trays to said plurality of consumers.

* * * * *